(12) United States Patent
Messer et al.

(10) Patent No.: US 7,418,141 B2
(45) Date of Patent: Aug. 26, 2008

(54) METHOD, APPARATUS, AND COMPUTER-READABLE MEDIUM FOR IDENTIFYING CHARACTER COORDINATES

(75) Inventors: Jason Andrew Messer, Loganville, GA (US); Varadachari Sudan Ayanam, Norcross, GA (US); Ramkumar Seshadri, Norcross, GA (US); Srinivasan S. Dharmapuri, Lilburn, GA (US)

(73) Assignee: American Megatrends, Inc., Norcross, GA (US)

(*) Notice: Subject to any disclaimer, the term of this patent is extended or adjusted under 35 U.S.C. 154(b) by 788 days.

(21) Appl. No.: 10/403,198

(22) Filed: Mar. 31, 2003

(65) Prior Publication Data

US 2004/0190773 A1 Sep. 30, 2004

(51) Int. Cl.
*G06K 9/46* (2006.01)
*G06K 9/46* (2006.01)
(52) U.S. Cl. .................................................. 382/201
(58) Field of Classification Search ................ 382/292, 382/165, 201
See application file for complete search history.

(56) References Cited

U.S. PATENT DOCUMENTS

| | | | |
|---|---|---|---|
| 4,589,068 A | 5/1986 | Heinen, Jr. ............... 717/127 |
| 4,979,074 A | 12/1990 | Morley et al. ............. 361/720 |
| 5,228,039 A | 7/1993 | Knoke et al. .............. 714/28 |
| 5,388,252 A | 2/1995 | Dreste et al. .............. 714/46 |
| 5,455,933 A | 10/1995 | Schieve et al. ............. 714/27 |
| 5,491,743 A | 2/1996 | Shiio et al. ................ 709/204 |
| 5,615,331 A | 3/1997 | Toorians et al. ........ 395/182.07 |
| 5,625,410 A | 4/1997 | Washino et al. |
| 5,630,049 A | 5/1997 | Cardoza et al. ............ 714/25 |
| 5,732,212 A | 3/1998 | Perholtz et al. ............ 709/224 |
| 5,777,874 A | 7/1998 | Flood et al. ................ 700/82 |
| 5,815,653 A | 9/1998 | You et al. .................. 714/38 |
| 5,819,093 A | 10/1998 | Davidson et al. .......... 717/126 |
| 5,850,562 A | 12/1998 | Crump et al. .............. 395/800 |
| 5,878,158 A * | 3/1999 | Ferris et al. ............... 382/125 |
| 5,953,451 A * | 9/1999 | Syeda-Mahmood ........ 382/187 |
| 5,990,852 A | 11/1999 | Szamrej .................... 345/2.1 |

(Continued)

OTHER PUBLICATIONS

U.S. Official Action dated Aug. 13, 2003 in U.S. Appl. No. 10/016,484.

(Continued)

*Primary Examiner*—Bhavesh Mehta
*Assistant Examiner*—Hadi Akhavannik
(74) *Attorney, Agent, or Firm*—Hope Baldauff Hartman, LLC

(57) ABSTRACT

Methods, apparatus, and computer-readable mediums for recognizing or identifying the location of characters within a computer image or display are provided. These methods, apparatuses, and computer-readable mediums make use of dynamic link libraries ("DLLs") and application program interfaces ("APIs") to locate, indicate the state of, and return the coordinates of specified characters or text within an image or display. The returned state and coordinates of the characters may also be used in conjunction with automated testing programs to assist the programs in delivering precise instructions to computer programs being tested. Further, the methods and computer-readable mediums make use of one or more operating system independent video and input/output redirection devices that allow remote control of a computer system from any network-connected location. By using such redirection devices in conjunction with an automated testing program utilizing character coordinates, software components may be precisely and efficiently tested from virtually anywhere in the world.

17 Claims, 9 Drawing Sheets

U.S. PATENT DOCUMENTS

| | | | |
|---|---|---|---|
| 6,011,920 A | 1/2000 | Edwards et al. | 717/130 |
| 6,035,059 A * | 3/2000 | Kurosawa et al. | 382/164 |
| 6,054,676 A | 4/2000 | Wall et al. | 219/209 |
| 6,055,334 A * | 4/2000 | Kato | 382/190 |
| 6,065,072 A | 5/2000 | Flath | 710/29 |
| 6,119,247 A | 9/2000 | House et al. | 714/38 |
| 6,124,811 A * | 9/2000 | Acharya et al. | 341/63 |
| 6,137,455 A | 10/2000 | Duo | 345/520 |
| 6,145,088 A | 11/2000 | Stevens | 714/2 |
| 6,170,021 B1 | 1/2001 | Graf | 710/15 |
| 6,219,695 B1 | 4/2001 | Guttag et al. | 709/217 |
| 6,243,743 B1 | 6/2001 | Freeny | 709/217 |
| 6,263,373 B1 | 7/2001 | Cromer et al. | 709/250 |
| 6,272,562 B1 | 8/2001 | Scott et al. | 710/16 |
| 6,304,895 B1 | 10/2001 | Schneider et al. | 709/203 |
| 6,330,167 B1 | 12/2001 | Kobayashi | 361/818 |
| 6,360,250 B1 | 3/2002 | Anupam et al. | 709/204 |
| 6,377,461 B1 | 4/2002 | Ozmat et al. | 361/704 |
| 6,378,014 B1 | 4/2002 | Shirley | 710/100 |
| 6,397,256 B1 | 5/2002 | Chan et al. | 709/229 |
| 6,414,716 B1 | 7/2002 | Kawai | 348/211 |
| 6,434,003 B1 | 8/2002 | Roy et al. | 361/699 |
| 6,476,854 B1 | 11/2002 | Emerson et al. | 348/143 |
| 6,552,914 B1 | 4/2003 | Chang | |
| 6,560,641 B1 | 5/2003 | Powderly et al. | 709/219 |
| 6,603,665 B1 | 8/2003 | Truong et al. | 361/752 |
| 6,609,034 B1 | 8/2003 | Ehrens et al. | 700/19 |
| 6,636,929 B1 | 10/2003 | Frantz et al. | 710/313 |
| 6,651,120 B2 * | 11/2003 | Chiba et al. | 710/65 |
| 6,651,190 B1 | 11/2003 | Worley et al. | 714/43 |
| 6,662,217 B1 | 12/2003 | Godfrey et al. | 709/219 |
| 6,664,969 B1 | 12/2003 | Emerson et al. | 345/544 |
| 6,681,250 B1 | 1/2004 | Thomas et al. | 709/226 |
| 6,754,891 B1 | 6/2004 | Snyder et al. | 717/128 |
| 6,816,963 B1 | 11/2004 | Krithivas et al. | |
| 6,820,267 B2 | 11/2004 | Christensen et al. | 719/315 |
| 6,825,846 B2 | 11/2004 | Mondal | 345/547 |
| 6,894,906 B2 | 5/2005 | Sivertsen | 361/796 |
| 6,959,380 B2 | 10/2005 | Dake et al. | 713/2 |
| 6,963,425 B1 * | 11/2005 | Nair et al. | 358/1.9 |
| 6,993,747 B1 | 1/2006 | Friedman | 717/124 |
| 7,039,229 B2 * | 5/2006 | Lin et al. | 382/165 |
| 7,165,041 B1 | 1/2007 | Guheen et al. | 705/26 |
| 7,231,606 B2 | 6/2007 | Miller et al. | 715/738 |
| 7,233,336 B2 | 6/2007 | Mondal | 345/547 |
| 7,260,624 B2 | 8/2007 | Sivertsen | 709/223 |
| 7,299,463 B2 | 11/2007 | Brannock et al. | |
| 2001/0027465 A1 | 10/2001 | Hammelbacher | 709/201 |
| 2001/0037366 A1 | 11/2001 | Web et al. | 709/204 |
| 2002/0040418 A1 | 4/2002 | Bress et al. | 711/112 |
| 2002/0087949 A1 | 7/2002 | Golender et al. | 717/124 |
| 2002/0097234 A1 | 7/2002 | Sauber | 345/204 |
| 2002/0103882 A1 | 8/2002 | Johnston et al. | 709/218 |
| 2002/0174415 A1 | 11/2002 | Hines | 717/127 |
| 2002/0194403 A1 | 12/2002 | Pua et al. | 710/62 |
| 2002/0199035 A1 | 12/2002 | Christensen et al. | 709/330 |
| 2003/0035049 A1 | 2/2003 | Dickens et al. | 348/14 |
| 2003/0058248 A1 | 3/2003 | Hockmuth et al. | 345/537 |
| 2003/0083842 A1 | 5/2003 | Miller et al. | 702/122 |
| 2003/0110244 A1 | 6/2003 | Mondal | 709/223 |
| 2003/0156132 A1 | 8/2003 | Gn et al. | 345/740 |
| 2003/0177111 A1 * | 9/2003 | Egendorf et al. | 707/3 |
| 2003/0200273 A1 | 10/2003 | Khanna et al. | 709/28 |
| 2003/0226015 A1 | 12/2003 | Neufeld et al. | |
| 2004/0059782 A1 | 3/2004 | Siverstsen | |
| 2004/0158614 A1 * | 8/2004 | Williams | 709/207 |
| 2005/0066000 A1 | 3/2005 | Liaw et al. | |
| 2005/0086670 A1 | 4/2005 | Christensen et al. | 719/330 |
| 2006/0189900 A1 | 8/2006 | Flaherty | 600/595 |
| 2006/0195042 A1 | 8/2006 | Flaherty | 600/544 |

OTHER PUBLICATIONS

U.S. Official Action dated Mar. 8, 2004 in U.S. Appl. No. 10/016,484.
U.S. Official Action dated Jun. 22, 2004 in U.S. Appl. No. 10/016,484.
U.S. Official Action dated Apr. 18, 2006 in U.S. Appl. No. 10/016,484.
U.S. Official Action dated Sep. 5, 2006 in U.S. Appl. No. 10/966,221.
U.S. Official Action dated Feb. 23, 2004 in U.S. Appl. No. 10/247,876.
U.S. Official Action dated Aug. 3, 2004 in U.S. Appl. No. 10/247,876.
U.S. Official Action dated Feb. 3, 2005 in U.S. Appl. No. 10/247,876.
U.S. Official Action dated Aug. 8, 2005 in U.S. Appl. No. 10/247,876.
U.S. Official Action dated Feb. 24, 2006 in U.S. Appl. No. 10/247,876.
U.S. Official Action dated Aug. 17, 2006 in U.S. Appl. No. 10/247,876.
U.S. Official Action dated Feb. 27, 2007 in U.S. Appl. No. 10/867,406.
U.S. Official Action dated Aug. 10, 2007 in U.S. Appl. No. 10/867,406.
U.S. Official Action dated Sep. 11, 2006 in U.S. Appl. No. 10/462,509.
U.S. Official Action dated Mar. 6, 2007 in U.S. Appl. No. 10/462,509.
U.S. Official Action dated Jun. 29, 2007 in U.S. Appl. No. 10/462,509.
U.S. Official Action dated Jan. 24, 2006 in U.S. Appl. No. 10/446,044.
U.S. Official Action dated Jul. 14, 2006 in U.S. Appl. No. 10/446,044.
U.S. Official Action dated Oct. 5, 2006 in U.S. Appl. No. 10/446,044.
U.S. Official Action dated Apr. 5, 2007 in U.S. Appl. No. 10/446,044.
U.S. Notice of Allowance and Allowability dated Jul. 15, 2004 in U.S. Appl. No. 10/016,484.
U.S. Notice of Allowance and Allowability dated Jan. 5, 2007 in U.S. Appl. No. 10/966,221.
U.S. Notice of Allowance and Allowability dated Apr. 11, 2007 in U.S. Appl. No. 10/247,876.
U.S. Notice of Allowance and Allowability dated Nov. 10, 2004 in U.S. Appl. No. 10/867,348.
"Z-Series Information Page" printout from Raritan website found at www.Raritan.com/products/kvm_switches/z_series/prd_line.aspx. Printed Feb. 10, 2006.
"New KVM Switching System Controls 2,048 Servers Using Cat5 Cable" printout from Raritan website found at http://www.raritan.com//about/abt_press_detail.aspx?&status=4&articleId=127, printed May 23, 2006.
Raritan Computer, Inc., "Raritan Announces New Paragon CIMS with Innovative DirectConnect Technology," a press release, Jan. 14, 2002, printed from www.raritan.com on Jan. 27, 2005.
U.S. Appl. No. 10/462,509, filed on Jun. 16, 2003, entitled "Method and System for Remote Software Testing" Inventor: Gene Rovang.
U.S. Appl. No. 10/446,044, filed May 27, 2003, entitled "Method and System for Remote Software Debugging" Inventors: Subramanian Shankar and Jason Messer.
U.S. Appl. No. 10/790,160, filed Mar. 1, 2004, entitled "Method, System, and Apparatus for Communicating With A Computer Management Device" Inventor: Subash Kalbarga.
U.S. Appl. No. 10/926,241, filed Aug. 25, 2004, entitled "Apparatus, Methods, and Systems for Redirecting Input and Output for Multiple Computers" Inventor: Clas G. Sivertsen.
U.S. Appl. No. 10/875,641, filed Jun. 24, 2004, entitled "Method and System for Remote Software Debugging" Inventor: Stefano Righi.
U.S. Official Action dated Sep. 18, 2007 in U.S. Appl. No. 10/446,044.
U.S. Official Action dated Jul. 27, 2007 in U.S. Appl. No. 10/875,641.
American Megatrends AMIDebug User's Guide (Version 2.0), 2002.
U.S. Official Action dated Dec. 17, 2007 in U.S. Appl. No. 10/790,160.
U.S. Official Action dated Dec. 27, 2007 in U.S. Appl. No. 10/867,406.
U.S. Official Action dated Jan. 8, 2008 in U.S. Appl. No. 10/446,044.

U.S. Official Action dated Jan. 10, 2008 in U.S. Appl. No. 10/875,641.

"Cable Allows Users to Extend DVI Connections," Jul. 31, 2001, *The Mac Observer*, printed from http://www.macobserver.com/article/2001/07/31.11.shtml, 4 pages.

American Megatrends AMIDiag for Windows User's Guide (Version 2.0), Feb. 25, 2002. http://ami.com/support/docc/MAN-DIAG-WIN.pdf.

U.S. Official Action dated Jun. 3, 2008 in U.S. Appl. No. 10/875,641.

U.S. Notice of Allowance/Allowability dated Jun. 9, 2008 in U.S. Appl. No. 10/446,044.

U.S. Official Action dated Nov. 29, 2007 in U.S. Appl. No. 10/462,509.

* cited by examiner

Fig. 6

METHOD, APPARATUS, AND COMPUTER-READABLE MEDIUM FOR IDENTIFYING CHARACTER COORDINATES

TECHNICAL FIELD

Embodiments of the invention relate generally to the field of character coordinate recognition or identification. More particularly, embodiments of the invention relate to utilizing character coordinates in the field of automated software testing.

BACKGROUND OF THE INVENTION

One of the most important parts of the software development process is the process of software testing. Testing refers to the process of repetitively executing portions of a computer program to ensure that the program is functioning correctly and to identify errors within the executing program code. Because the testing process can be very repetitive, and therefore stressful on humans, automated testing programs have been developed that simulate human user input to a computer program. In particular, scripts can be generated for use with an automated testing program that simulate user input to the program to be tested in a particular order. For instance, a script may contain instructions for entering keystrokes, mouse movement and selection, and other types of user input commands. In order to execute instructions contained in such a script for dynamically navigating through the bitmapped images generated by the program being tested, the automated testing program must receive coordinates that identify where certain characters or text are located within the bitmapped screen display. Character coordinates enable the automated testing program to simulate user input and locate specific graphics or text within a bitmapped image so that script instructions may be executed upon elements shown in the bitmapped image, such as menus, user interface elements, and the like.

Traditionally, automated testing programs, optical character recognition ("OCR") programs, and other similar programs do not provide the coordinates of where characters or text are located within bitmap images. In the case of automated testing programs, the user must specify the coordinates or location of the characters. This enables the automated testing program to locate the specified characters or text within the bitmapped image generated by the software being tested. However, requiring user input of the desired coordinates greatly hinders the software testing process because the user performing the testing may not know the coordinates of the text or characters being sought. In the alternative, routines that submit every possible coordinate to the automated testing program with hopes of finding the desired text are unreliable and time consuming. This may be extremely inconvenient when it is necessary to test the software components of any computer system, especially those located across the country or even the world.

It is with respect to these considerations and others that the various embodiments of the present invention have been made.

SUMMARY OF THE INVENTION

In accordance with the present invention, the above and other problems are solved by methods for identifying or recognizing the coordinates of characters ("character coordinates") located within a bitmapped image. These methods, apparatuses, and computer-readable mediums make use of dynamic link libraries ("DLLs") and application program interfaces ("APIs") to locate, indicate the state of, and return the coordinates of specified characters or text within a bitmapped image or display. The returned state and coordinates of the characters may be used in conjunction with automated testing programs to assist the programs in delivering precise instructions to computer programs being tested. Further, the methods and computer-readable mediums may make use of one or more operating system independent video and input/output redirection devices that allow remote control of a computer system from any network-connected location. By using such redirection devices in conjunction with an automated testing program utilizing character coordinates, software components may be precisely and efficiently tested from virtually anywhere in the world.

In accordance with featured aspects, the invention relates to a method for identifying the location of characters or text within a bitmapped image or display. According to the method, a computer receives a search string that identifies the characters or text to be found. Next, a bitmap of the search string characters and a request to locate the search string within the image are generated. In order to locate the search string within the image, a comparison of the bitmap of the search string is made with the entire image. If the bitmap of the search string is found within the image, the location of the search string characters or text is returned. The location may be expressed in pixel coordinates.

In accordance with other features of the present invention, the bitmap of the search string may be generated using specified text color, background color, and font type and size. These characteristics may be expressed as a range or as a specific entry. Further, indicators as to whether the characters of the search string are bold, italic, underlined, or strikethrough may be used to generate the bitmap of the search string.

In the alternative, the present invention may compare binary representations of the search string and image instead of bitmaps. This capability counters distortion and allows for tolerance when dealing with images containing fonts that are not scalable. Colors within the image that are within a designated range of the specified text color are given a value in the binary representation that is equal to the text color value. Moreover, indicators as to whether the inverse of the binary representation of the search string is present within the image may be returned along with its location. This feature informs the user as to whether the search string characters have been highlighted within the image. In addition to the location of the search string and an indication as to whether the text has been highlighted, the present invention may return the value of text adjacent to the search string text. This feature may be used to identify text located in an optional field.

In accordance with other featured aspects, the invention relates to a method for identifying the location of characters within a display generated by a remote computer where the character locations are used for testing a computer program executing on the remote computer and the computer program is tested from a local computer utilizing an automated testing program. According to the method, the remote computer executes a computer program to be tested. The video output of the remote computer, including the bitmapped screen display generated by the computer program to be tested, is transmitted to the remote computer. The video output of the remote computer, including the screen display generated by the program to be tested, may then be displayed at the local computer.

User input commands may be generated at the local computer by an automated testing program utilizing returned character coordinates to help precisely determine where certain text is located. By identifying the location of a menu item within a screen display, additional user input commands may be generated for execution on the remote computer. The user input commands are then transmitted from the local computer to the remote computer and executed at the remote computer to control the operation of the computer program to be tested. The input commands are executed at the remote computer as if the commands were physically generated at the remote computer by one or more input devices physically connected to the remote computer.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 6 illustrates a process for converting an image or display to a binary representation in another embodiment of the invention;

DETAILED DESCRIPTION

As described briefly above, embodiments of the present invention provide methods, apparatus, and computer-readable mediums for identifying the coordinates of characters or text within a bitmapped image or display. In the following detailed description, references are made to the accompanying drawings that form a part hereof, and in which are shown by way of illustration specific embodiments or examples.

These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
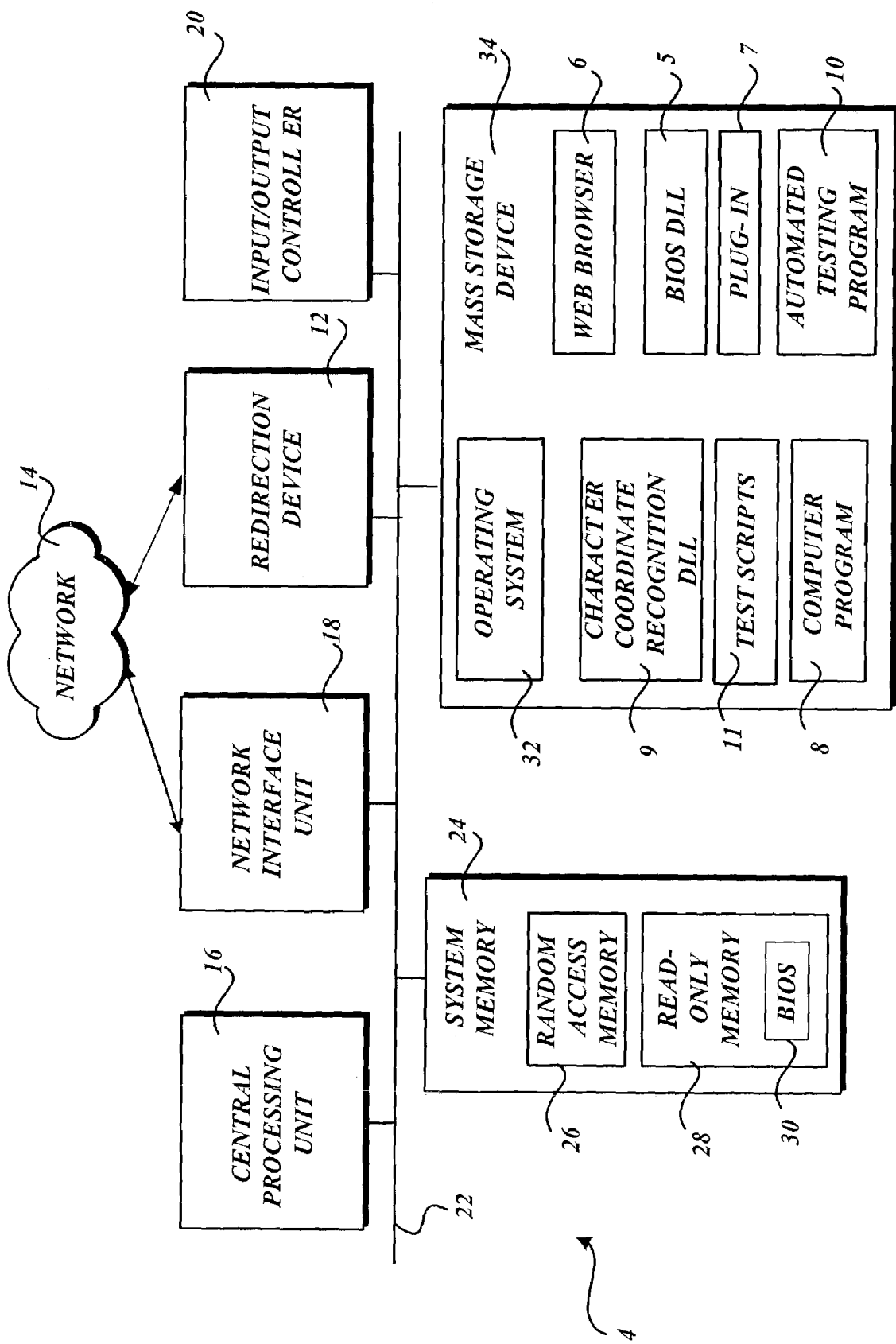
FIG. 1 illustrates a computer architecture for a computer system utilized in the various embodiments of the invention.
Figure 2:
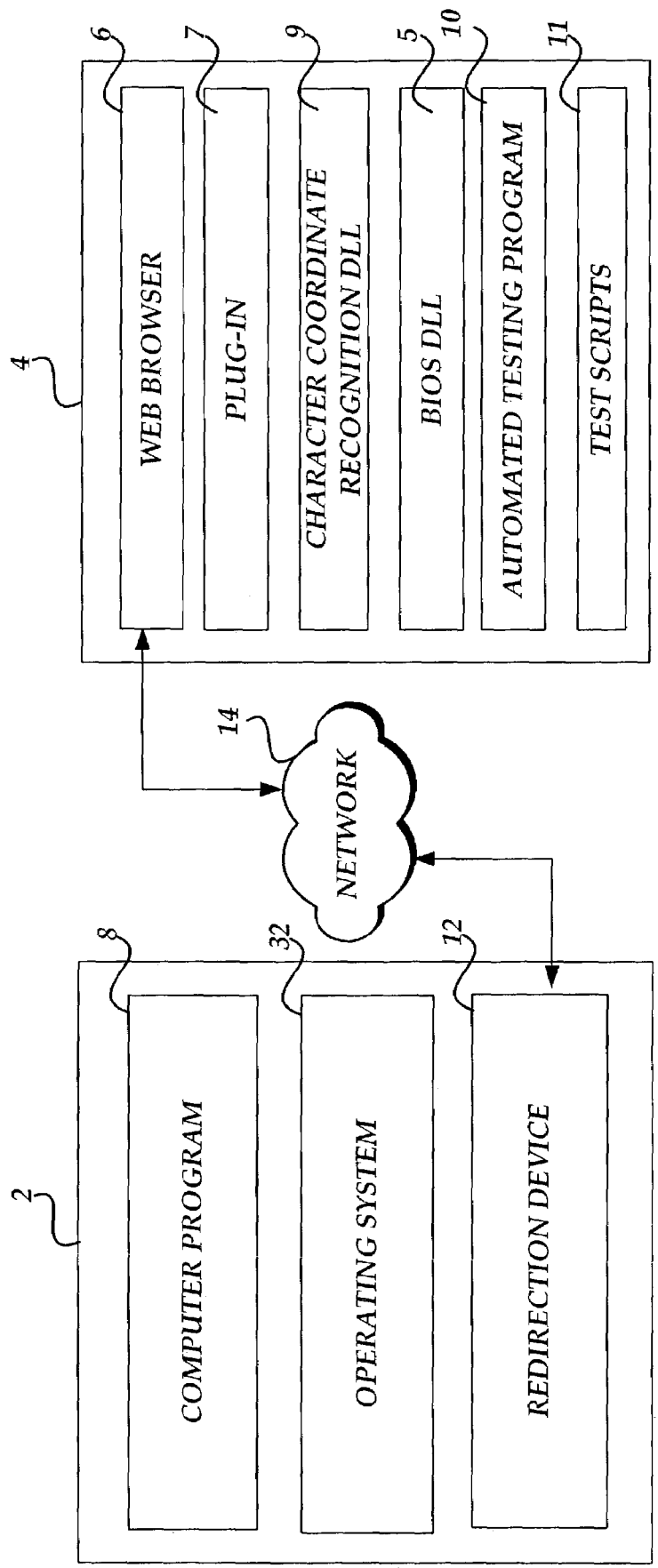
FIG. 2 shows a system for remotely testing a computer program provided in another embodiment of the invention.

Referring now to the drawings, in which like numerals represent like elements throughout the several figures, aspects of the present invention and the illustrative operating environment will be described. FIGS. 1-2 and the following discussion are intended to provide a brief, general description of a suitable computing environment in which the embodiments of the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a local computer 4 for practicing the various embodiments of the invention will be described. The computer architecture shown in FIG. 1 illustrates a conventional server or personal computer, including a central processing unit 16 ("CPU"), a system memory 24, including a random access memory 26 ("RAM") and a read-only memory ("ROM") 28, and a system bus 22 that couples the memory to the CPU 16. A basic input/output system ("BIOS") 30 containing the basic routines that help to transfer information between elements within the computer, such as during startup, is stored in the ROM 28. The computer 4 further includes a mass storage device 34 for storing an operating system 32 suitable for controlling the operation of a networked computer, such as the WINDOWS NT or XP operating systems from MICROSOFT CORPORATION of Redmond, Wash. The mass storage device 34 also stores application programs, such as a computer program 8, an automated testing program 10, a character coordinate recognition DLL 9, a BIOS DLL 5, a Web browser application 6, plug-in 7, and data, such as test scripts 11 used by the automated testing program 10. The character coordinate DLL 9 or BIOS DLL 5 are called to locate specific text within an image and return the text or character coordinates. The DLL 9 or BIOS DLL 5 may return coordinates to automated testing program 10 which works in conjunction with test scripts 11 to test computer program 8. The computer program 8 may be tested when stored on the local computer 4 or when stored on a remote computer when the automated testing program on the local computer 4 is utilized in conjunction with plug-in 7, Web browser 6, and the redirection device 12 described below. Additional details regarding each of these software components will be provided below.

The mass storage device 34 is connected to the CPU 16 through a mass storage controller (not shown) connected to the bus 22. The mass storage device 34 and its associated computer-readable media, provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 1). Similarly, an input/output controller 20 may provide output to a display screen, a printer, or other type of output device.

The computer 4 may also include an operating system independent video and input/output redirection device 12 ("a redirection device"). The redirection device 12 may be internal or external to the computer 4. The redirection device receives and compresses the video output of the computer 4 for transmission over the network 14. The redirection device 12 also transmits the compressed screen displays to a plug-in 7 executing on a similarly configured but remotely located computer, where the data may be decompressed and displayed. Because the redirection device 12 is implemented in hardware, operation of the redirection device 12 is not dependent on the execution of a particular type of operating system 32. Moreover, because the redirection device 12 is implemented in hardware, the operating system 32 does not have to be loaded by the computer 4 for the screen displays of the computer 4 to be compressed and transmitted. In this manner, the computer 4 may be remotely controlled immediately after it is powered on and without the need to load any operating system. In this manner, for instance, functions provided by the BIOS 30 for configuring the computer 4 may be remotely controlled without the need for operating system support.

The redirection device 12 also includes input/output ports for connecting peripheral input devices that would otherwise be connected to the computer 4. In particular, a mouse and keyboard (not shown in FIG. 1) may be directly connected to the redirection device 12. Input commands received by these devices may then be passed by the redirection device 12 to the input/output controller 20. Additionally, user input commands may also be received by the plug-in 7 at a remotely located computer. These commands may be generated by a user or by an automated testing program 10 and are transmitted by the plug-in 7 to the redirection device 12. The remotely generated commands are also passed from the redirection device 12 to the input/output controller 20 for execution on the computer 4 as if the commands were generated locally. In this manner, the operation of the computer 4 and, in particular, the operation of the computer program 8, the operating system 32, or the BIOS 30 may be completely controlled from a remotely located computer.

Turning now to FIG. 2, a system for remotely testing a computer program provided in one embodiment of the invention will be described. As shown in FIG. 2, the system includes a local computer 4. As described above with respect to FIG. 1, the local computer 4 comprises a standard personal or server computer operative to execute a Web browser application program 6, such as the INTERNET EXPLORER browser from MICROSOFT CORPORATION of Redmond, Wash. Alternatively, the local computer 4 may comprise another type of computing device operative to access a network 14, such as a personal digital assistant or other type of computer. The local computer 4 is also connected to a network 14, such as a LAN or the Internet. It should be appreciated, however, that the local computer 4 may be configured for communication over other types of distributed computing networks.

The local computer 4 also includes a plug-in 7 for use in conjunction with the Web browser 6. As known to those skilled in the art, plug-ins may be created utilizing ACTIVEX technology from MICROSOFT CORPORATION, JAVA from SUN MICROSYSTEMS, or other similar technologies from other vendors, that allow special functions to be performed within a Web browser. In particular, the plug-in 7 executes in conjunction with the Web browser 6 and communicates with a redirection device 12 operating in conjunction with a remote computer 2. As will be described in greater detail below, the plug-in 7 receives screen displays from the redirection device 12 and displays them at the local computer 4. The plug-in 7 also receives user input commands, such as mouse or keyboard commands, from an automated testing program 10 executing on the local computer 4 and transmits these commands to the redirection device 12. The redirection device 12 may then provide the commands to remote computer 2, where they may be executed on the remote computer 2 as if they were physically received via an input device connected directly to the remote computer 2.

The automated testing program 10 comprises an application program for testing the functionality of programs executing on a computer system. In particular, the automated testing program 10 allows the creation and execution of test scripts 11 that define a sequence of user interface commands that should be executed on the computer 4. When the test scripts are executed by the automated testing program 10, the input commands are transmitted and executed on the computer as if the commands were generated by a user physically utilizing the computer. For instance, keystrokes, mouse movements, mouse clicks, and other types of user interface commands may be generated. As will be discussed in greater detail below, the user interface commands generated by the automated testing program 10 may be applied to a user interface window displayed at the local computer 4 by the plug-in 7 and including a screen display generated by the computer program 8 executing on the remote computer 2. The user interface commands directed to the window provided by the plug-in 7 may then be intercepted by the plug-in 7 and transmitted to the remote computer 2 for execution thereupon. One example of an automated testing program 10 is the WINRUN- NER automated testing program provided by MERCURY INTERACTIVE, INC., of Sunnyvale, Calif. It should be appreciated that other types of automated testing programs may be similarly utilized. These automated testing programs request character or text coordinates but do not provide them.

The character coordinate DLL 9 or the BIOS DLL 5 may be called during the execution of test scripts 11 by the automated test program 10. DLL 9 contains functions to set the text and background colors, font size, font type, and font characteristics, such as bold or underline. Also, BIOS DLL 5 and DLL 9 both contain functions to create bitmaps of the search string and image utilizing win32 APIs, and functions for finding the search string within the image and returning its coordinates. Furthermore, BIOS DLL 5 is equipped with a function to indicate whether the search string has been highlighted or selected within the image and a function to locate and return the text next to the search string. Character or text coordinates, highlight indications and specific text may be used by automated test program 10 in creating test scripts that include the returned coordinates. For instance, the coordinates may be used in a test script to instruct a mouse as to where to click on a "My Computer" icon located within an image. Additional details regarding the operation of DLL 9 and BIOS DLL 5 in conjunction with automated test program 10 will be provided below with respect to FIGS. 2 and 6-9.

The remote computer 2 also comprises a standard desktop or server computer system. The remote computer 2 is connected to the network 14 and is operative to execute a computer program 8 to be tested. The computer program 8 to be tested may comprise an operating system 32 program, a BIOS, an application program, or any other type of program capable of being executed on the remote computer 2. The remote computer 2 also supports the use of a redirection device. As discussed above with respect to FIG. 1, the redirection device 12 receives the video output of the remote computer 2 and compresses the video output for transmission to the plug-in 7 executing on the local computer 4. The redirection device then transmits the compressed video output of the remote computer 4 to the plug-in 7 executing on the local computer 2 via the network connection. The plug-in 7 is operative to decompress the data stream and to display the video output of the remote computer 2 on the local computer 4. The displayed output may include screen displays generated by the computer program 8 or the operating system 32.

The plug-in 7 is also operative to receive user input commands, such as mouse or keyboard commands, generated at the local computer 4 either by a user or by the automated testing program 10 and to transmit the commands to the redirection device 12. The redirection device 12 can receive the user input commands from the plug-in 7 and provide the input commands to the remote computer 2 as if the input commands were physically generated by a user at the remote computer 2. In order to provide this functionality, the redirection device 12 may be physically and electrically connected to the input ports of the remote computer 2 (serial, Universal Serial Bus ("USB"), etc.). The redirection device 12 may also provide connections for user input devices located at the remote computer 2 and may pass through signals received at the user input devices to the remote computer 2. In this manner, user input commands generated by a user physically located at the remote computer 2 may be passed through to the remote computer 2.

Moreover, through the use of the plug-in 7 and the redirection device 12, a user of the local computer 4 can control the operation of the remote computer 2 from a remote location. In particular, a user of the local computer 4 may utilize the test scripts 11 of the automated testing program 10 to test the execution of the computer program 8. According to one embodiment of the invention, the computer program 8 comprises a BIOS utilized by the remote computer 2. However, the computer program 8 may comprise other types of computer programs, such as operating system programs, application programs, device drivers, and others.

It should be appreciated that the redirection device may comprise a device located internal to the remote computer 2 or an external device connected to the external connections of the remote computer 2. One example of an external redirection device comprises an external device that may be connected to the external video output of the remote computer 2, to the network 14, and to the user input devices located at the remote computer 2. Such a device is described in U.S. Pat. No. 7,260,624, entitled "Systems and Methods for Establishing Interaction Between A Local Computer and a Remote Computer", which is assigned to the assignee of the instant patent application and expressly incorporated herein.

Another embodiment may comprise a redirection device that is integrated with the main system board of the remote computer 2 or contained on an adapter card located within the remote computer 2. Such a device is described in U.S. Pat. No. 6,825,846, entitled "Systems and Methods for Capturing Screen Displays From A Host Computing System for Display At A Remote Terminal", which is also assigned to the assignee of the instant patent application and expressly incorporated herein. It should be appreciated that other types of redirection devices may also be utilized.

Figure 3:
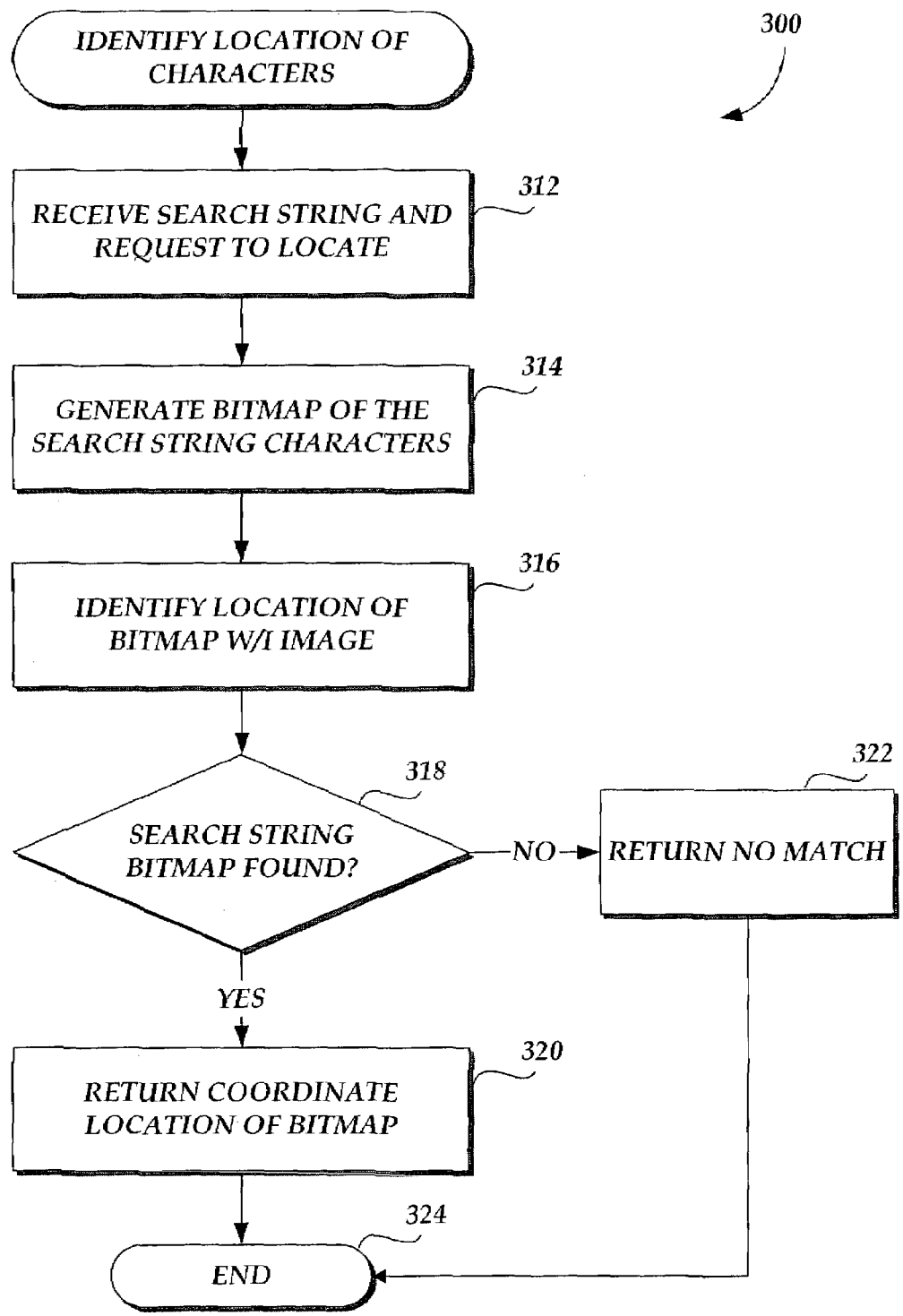
FIG. 3 illustrates an operational flow for identifying the location of one or more characters within an image utilized in one embodiment of the invention.

Turning now to FIG. 3 an illustrative routine 300 will be described for identifying the location of one or more characters within an image according to one embodiment of the invention. The routine 300 begins at block 312, where computer 4, via the character coordinate recognition DLL 9, receives a search string of the characters and a request to identify or recognize the location of the characters within a computer screen image or display. The search string and request may include specifics for the search such as: text color, background color, range of fonts and font sizes to search, and a designation for bold, italic, underlined, or strikethrough script. From block 312, the routine 300 continues to block 314, where a bitmap of the search string is generated utilizing the above specifications. At block 316, the image or display is compared to the search string bitmap to identify the location of the bitmap within the image or display. This may be accomplished by executing a pixel by pixel comparison between the search string and the image until the search string characters are found or the entire image has been searched. It should be appreciated that this search may be accomplished by comparing only the image pixels matching the specified text color and disregarding the other pixels or by searching and comparing both the text and the background color. Moreover, instead of the entire color value for each pixel being stored and compared, a portion of the value may be stored and compared for the purpose of enhancing speed. For instance, the red value of a red, green, blue color value may be the only portion that is stored for purposes of comparison.

From block 316, the routine 300 continues to block 318, where a determination is made as to whether the search string bitmap was found within the computer image or display. If the search string bitmap was found within the image, the routine 300 continues to block 320, where the location of the search string bitmap within the image is returned. The location may be returned in the form of pixel coordinates outlining a rectangle that identifies where the characters of the search string are located within a display or image. The routine 300 then returns control to other routines at block 324. If the search string bitmap was not found within the image or display, the routine 300 continues to block 322, where an indication of no match is returned. From block 322, the routine 300 then terminates at block 324.

Figure 4A:
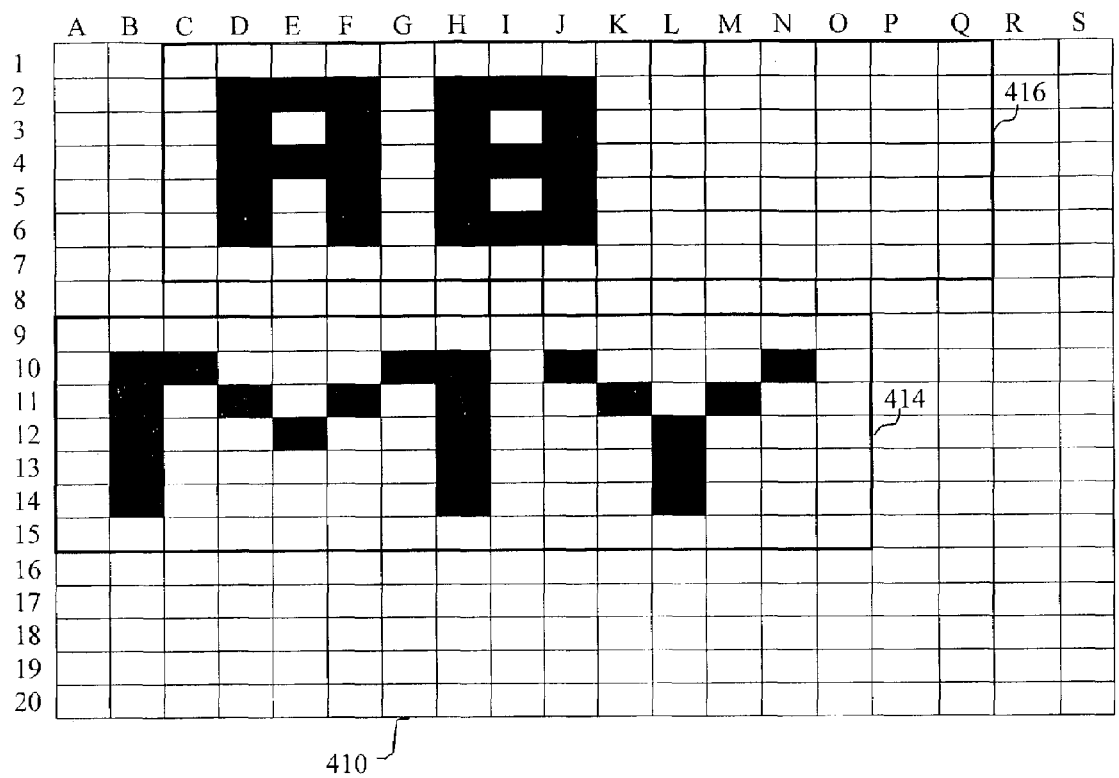
FIGS. 4A-4B illustrate an image and a bitmapped search string produced by a computer provided in an embodiment of the invention.
Figure 4B:
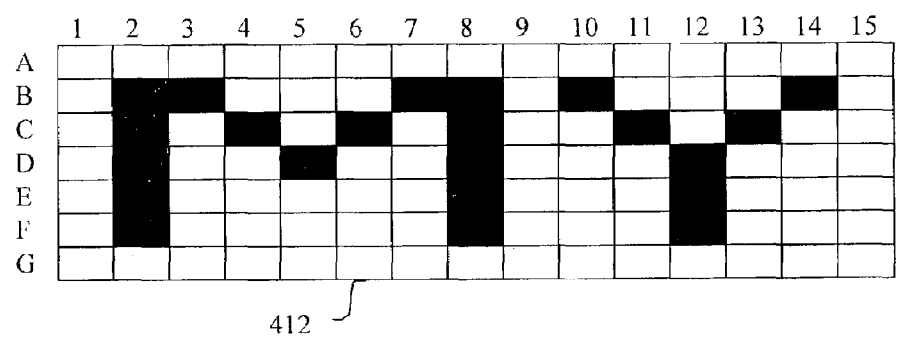

Turning now to FIGS. 4A and 4B, an illustrative screen display 410 and bitmapped search string 412, provided by the local computer 4, will be described. The screen display 410 shows an illustrative screen display provided by a computer 4 executing the character coordinate recognition DLL 9. DLL 9 is called once the search string is entered. In particular, the screen display 410 shows four characters located at various coordinates within the image and the bitmapped search string 412 shows the characters M and Y bitmapped within a seven row and 15 column footprint.

During the routine 300 operation at block 316, a pixel by pixel comparison is made between the search string bitmap 412 and the display or image 410 to identify the location of the search string characters 412 within the image 410. For instance, when the top left corner pixel of the search string bitmap 412, A/1 reaches pixel 1/C within the image, the pixel by pixel comparison examines the rectangular area 416 within the image represented by the row/column pixel coordinates 1/C, 1/Q, 7/C, and 7/Q. This comparison is a match until pixel B/4 of the search string is compare with pixel 2/F of the image. The A and B characters within the rectangular area of the image 410 will not return a match for the M and Y characters of the search string.

However when pixel A/1 of the search string 312 reaches pixel 9/A of the image 410 a search string match occurs and the location of the search string within the image is returned. This may be accomplished by returning the coordinates 9/A, 9/O, 15/A, and 15/O. In the alternative a central coordinate, such as 12/H may be returned to show the vicinity where the characters of the search string are located.

Figure 5:
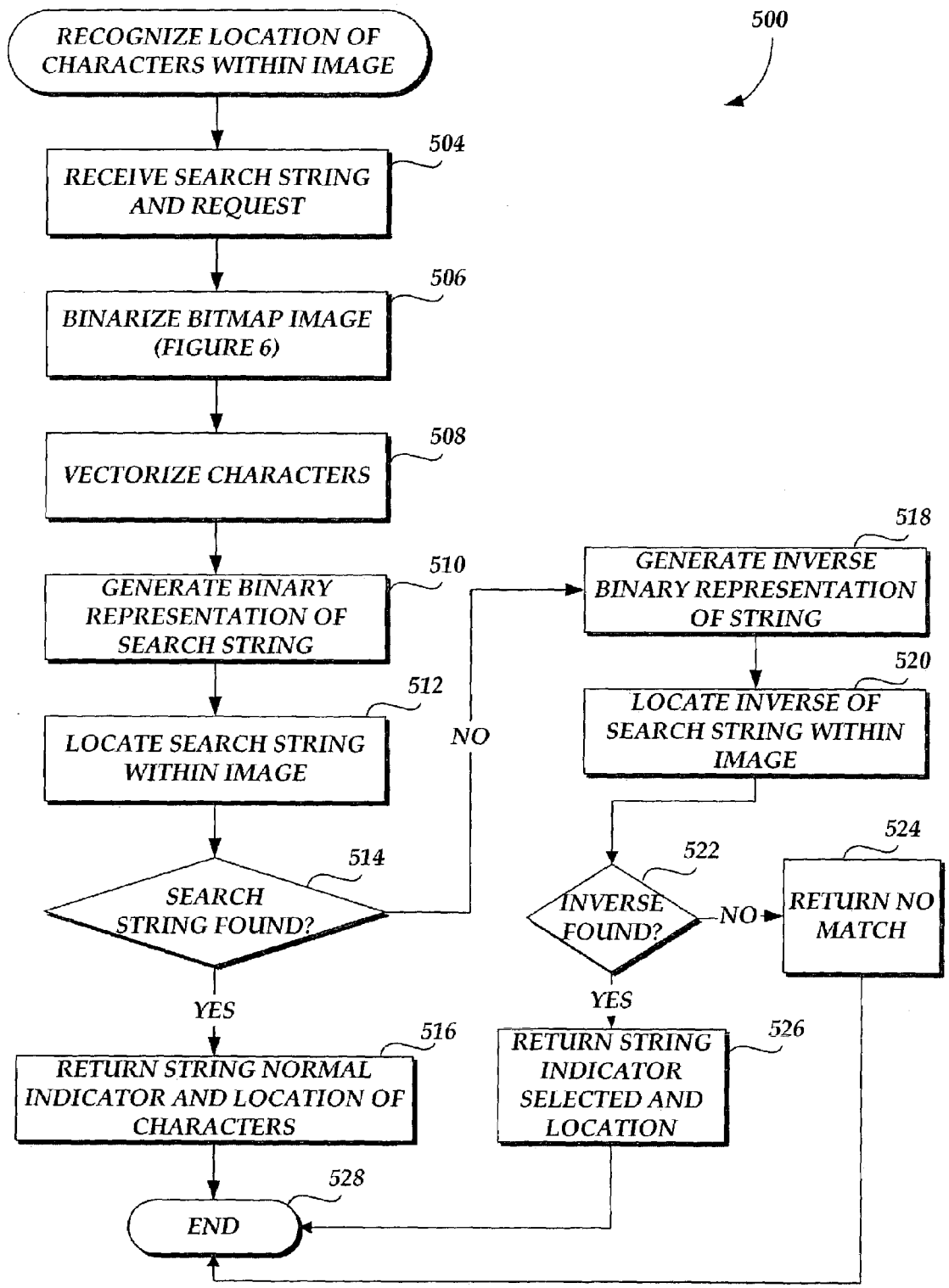
FIG. 5 illustrates an operational flow for recognizing the location of one or more characters within an image utilized in another embodiment of the invention.
Figure 6:
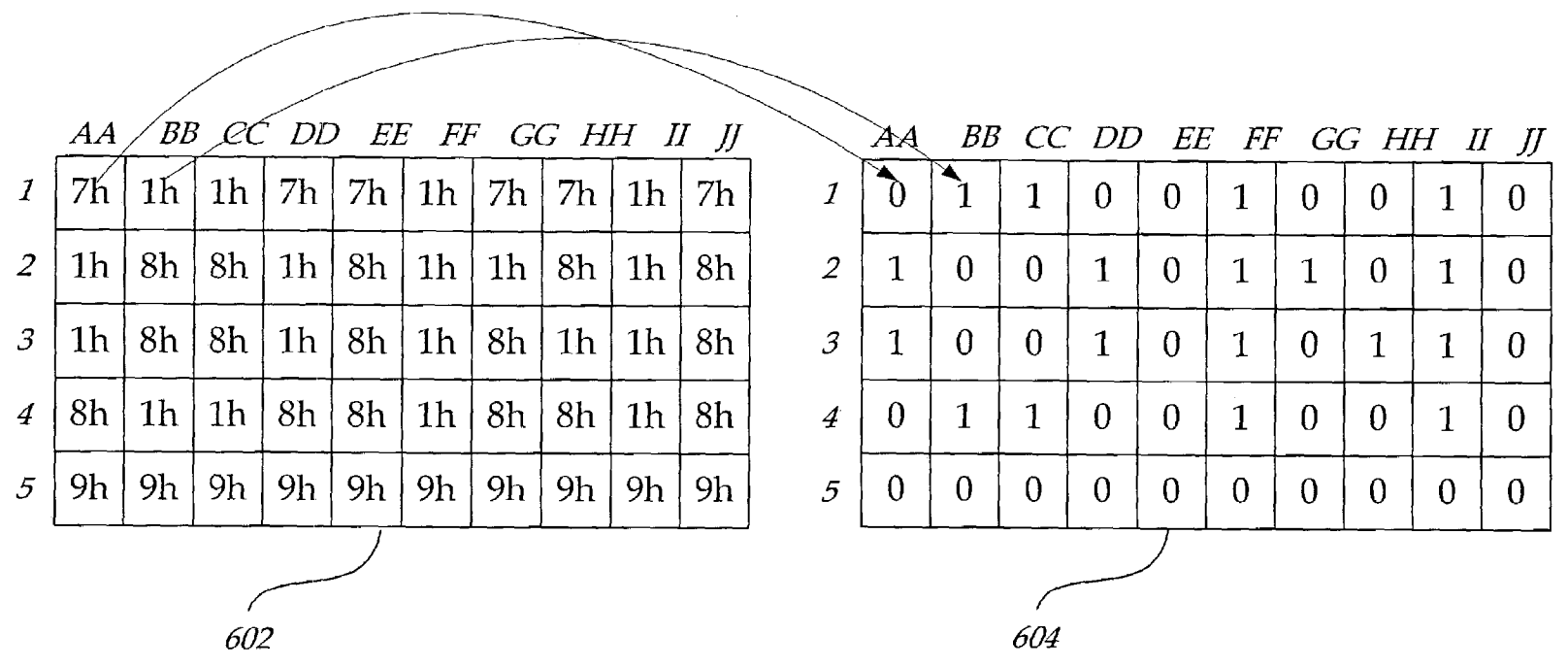

Referring now to FIG. 5, an operational flow for routine 500, recognizing the location of one or more characters within an image utilized in another embodiment of the invention will be described. The routine 500 begins at block 504, where the computer 4, via the BIOS DLL 5, receives a search string of the characters and a request to identify or recognize the location of the characters within a computer screen image or display. From block 504, the routine 500 continues to block 506, where the image or display is converted to a binary representation. Referring now to FIG. 6, a process for converting an image or display to a binary representation will be described.

FIG. 6 shows image 602, which illustrates the color values for each pixel within the image. Colors in this embodiment are given hexadecimal values. It should be appreciated that the color value may be specified in terms of red, green, and blue values for one or even three byte per pixel configurations. Binarizing refers to a process for converting an image expressed as red, green, and blue color values to an expression using only 0's and 1's. Block 506 in FIG. 5, converts image 602 into a binary representation based on a set range of pixel color values. For instance if the set range for pixel color values is less than or equal to 3h, the binarizing module will convert every pixel at or below 3h color value to a first value such as 1. Moreover for every pixel color value greater than 3h, block 506 will convert the pixel color value to a second value such as 0. Upon completion of the binarizing process the image will convert image 602 to a binary representation as illustrated in image 604.

For instance, as explained above, image 602 pixel 1/AA, in row/column format and at a color value of 7h, converts to a zero (0) in image 604 after being binarized. Similarly, image 602 pixel 1/BB, at color value 1h converts to a one (1) in image 604 during the binarizing operation 506. Upon close examination, it becomes clear that the binarized image represents the characters 'ON'. It should be appreciated that the binarizing module generates an image that converts color values to a one (1) if they are close but not as dark as the text color. This capability helps to insulate the comparison process from distortion and allows for range of color tolerance with non-scalable fonts. For instance scalable fonts adjust well to changes in resolution with the aide of an operating system, however, non-scalable fonts such as in BIOS setup will become distorted when a resolution change takes place. Binarizing the image after a resolution change minimizes the effect of distortion, thereby making the characters or fonts easier to find during image comparison.

Figure 7A:
FIGS. 7A-7B illustrate a process for converting characters to binary representations based on associated vector values in another embodiment of the invention.
Figure 7B:

Returning to FIG. 5, the routine 500 continues from binarizing operation 506 to vectorizing operation 508. At operation 508 the characters of the search string are individually associated with a text code. The text code may comprise the American Standard Code for Information Interchange (ASCII). The corresponding text codes are each associated with a stored vector value. Each vector value produces a binary representation of the search string character. Referring to FIGS. 7A-7B for an illustration, binary representation 702 is generated from the stored vector value 2222/2222, which through a text code, associates with search string character 'O'. Similarly, binary representation 704 is generated from the stored vector value 2332/4114. Vector values represent the number of first values (1) in a row and a column respectively, as illustrated in FIGS. 7A-7B. For example binary representation 704 has two ones (1) in its first row thereby corresponding to a two (2) in the first portion of the vector value.

Returning to FIG. 5, once the binary representation for each of the characters of the search string are produced from the corresponding vector value, the routine 500 continues to block 510 where the representations are combined to create a binary representation for the search string. Here the binary representation for each individual character of the search string is combined to form one binary representation for the search string. Next, the routine 500 continues to block 512 where the binary representation of the search string is compared with the binary representation of the image 604 to locate the search string within the image. Routine 500 then continues from block 512 to block 514 where a determination is made as to whether the search string was found in the image. If the search string was found the routine 500 continues to block 516, where an indicator is returned indicating that the characters within the search string have not been selected or highlighted in the image. Moreover, the coordinates of the search string within the image are returned. Routine 500 then terminates at block 528.

If the search string was not found within the image, the routine 500 branches to block 518 where the inverse binary representation of the search string is generated. The inverse binary representation converts all the ones (1) to zeroes (0) and all the zeroes (0) to ones (1), thereby indicating the color values are inverted such that the search string has been highlighted or selected within the image. Once the inverse search string has been generated, routine 500 continues from block 518 to block 520, where a search is conducted within the binary representation of the image 604 for the inverse search string. The routine 500 continues to block 522, where a determination is made as to whether the inverse search string was found within the image. If not, routine 500 branches to block 524 where an indication of 'no match' is returned, and the routine then terminates at block 528.

If the inverse search string is found within the image, the routine 500 branches to block 526 where the coordinates of the characters and an indicator that the characters have been selected or highlighted within the image are returned. Next the routine 500 terminates at block 528.

Figure 8:
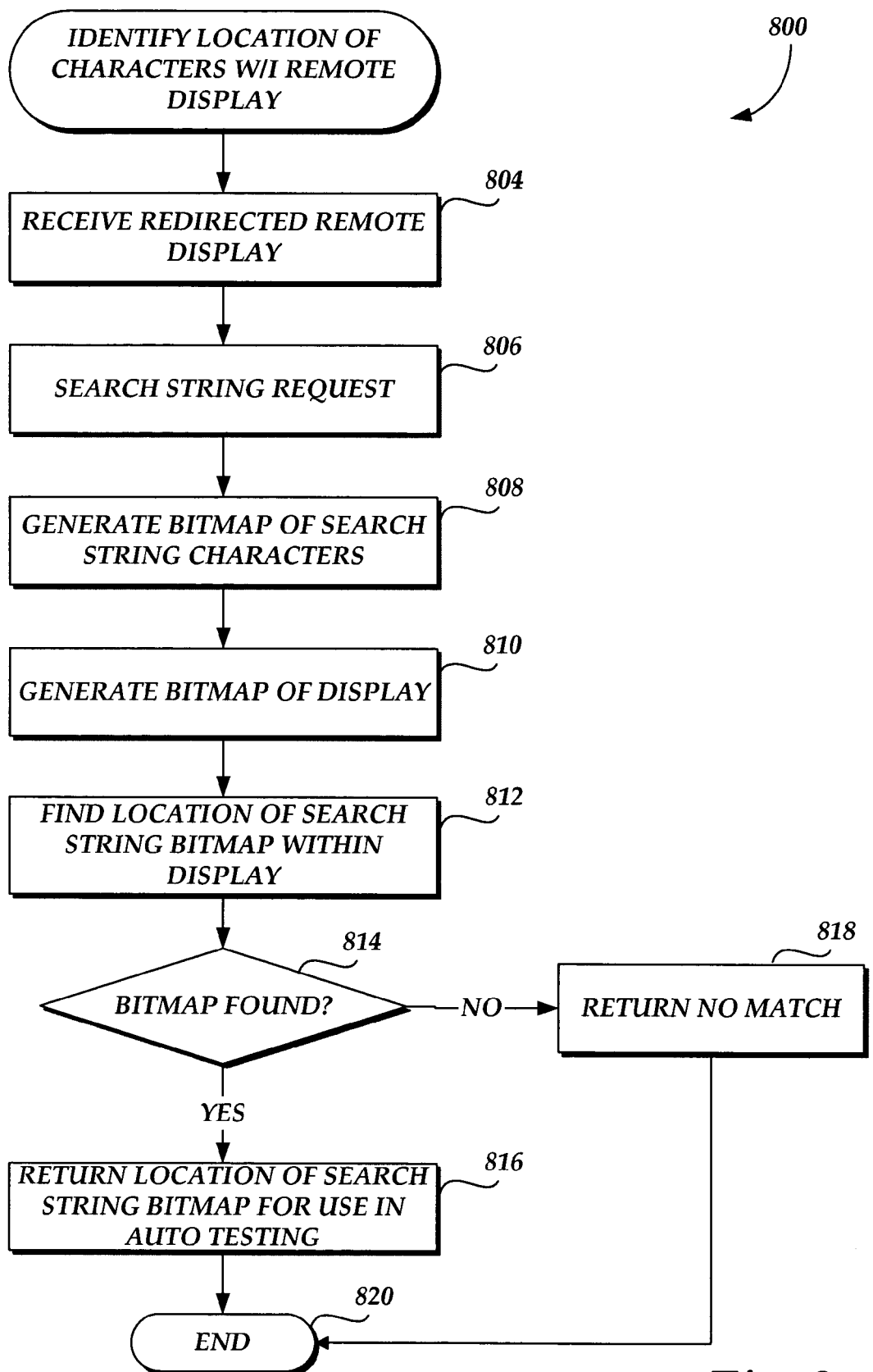
FIG. 8 illustrates an operational flow for identifying the location of characters within a display generated on a remote computer and for returning the character coordinates to an automated testing program in one embodiment of the invention.
Figure 9:
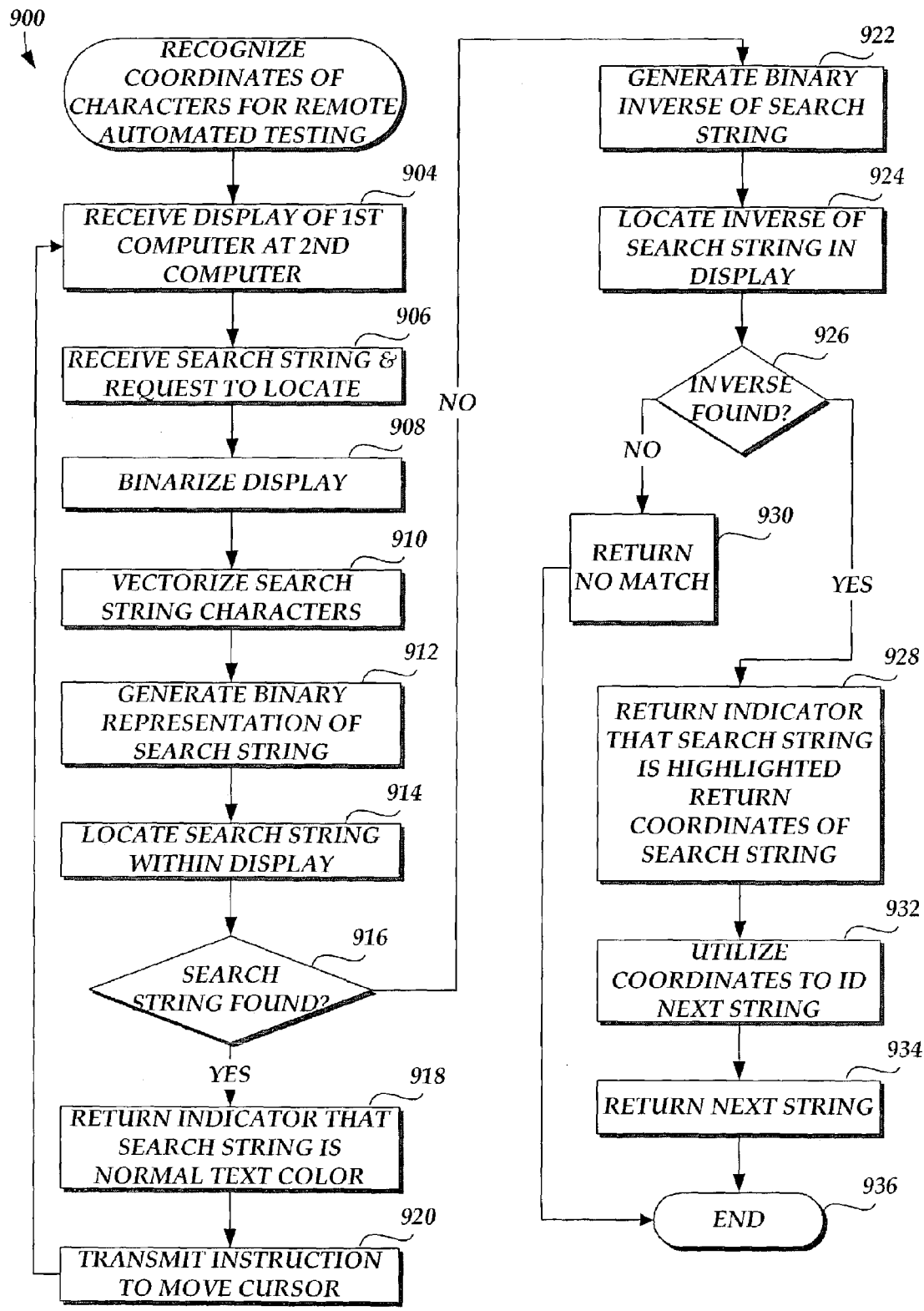
FIG. 9 illustrates an operational flow for recognizing the coordinates of characters within a display generated on a first computer wherein the character coordinates are used for testing a computer program executing on the first computer from a second computer in another embodiment of the invention.

Turning now to FIGS. 2 and 8 an illustrative routine 800 for identifying the location of characters within a display generated on a remote computer and returning the character coordinates to an automated testing program according to one embodiment of the invention will be described. The routine 800 begins at block 804, where the remote computer 2 executes the computer program 8 to be tested. The local computer 4 receives the redirected display of the remote computer 2 via the redirection device 12 transmitted to the plug-in 7 and displays the output in a window or full screen. It should be appreciated that the redirection device 12 and the plug-in 7 perform the transmitting and displaying functions, respectively, in a continual manner so that an updated video display is continually displayed at the local computer 4. Moreover, it should be appreciated that displaying the video output of the remote computer 2 at the local computer 4 is not necessary to test the computer program 8.

From block 804, the routine 800 continues to block 806, where the DLL 9 receives search string characters and specifications such as text color, background color, font type and size, and whether the fonts are bold, italic, underlined, or strikethrough. At block 808, a bitmap of the search string characters is generated. From block 808, the routine 800 continues to block 810, where a bitmap of the redirected display is generated. Both the display and search string bitmaps may be generated by win32 APIs. Next, the routine 800 continues from block 810 to block 812 where the routine compares the bitmaps to locate the search string within the image. This may be accomplished by executing a pixel by pixel comparison between the search string and the image until the search string characters are found or the entire image has been searched. It should be appreciated that this search may be accomplished by comparing only the image pixels matching the specified text color and disregarding the other pixels or by searching and comparing both the text and the background color.

Routine 800 continues from block 812 to block 814 where a determination is made as to whether the search string was found within the image. If the search string is not found, the routine 800 branches NO from block 814 to block 818 where an indication of 'No Match' is returned. Then the routine 800 terminates at block 820. If the search string has been found, routine 800 branches to block 816 where the coordinates of the search string are returned to the automated test program 10 for use in conjunction with the test scripts 11. The routine then terminates at block 820.

User input commands generated by the automated testing program 10 based on the test scripts 11 and including coordinates for where specified text is located are directed to the display of the remote computer 2. The commands generated by the automated testing program 10 are received by the plug-in 7 and are transmitted to the redirection device 12. The commands may then be passed by the redirection device 12 to the remote computer 2 for execution at the remote computer 2 as if the commands were received at input devices physically connected to the remote computer 2.

In particular, user input commands utilizing character coordinates may be generated by the automated testing program 10 and directed to screen displays generated by the computer program 8. The user interface commands may then be passed to the remote computer 2 and executed on the computer program 8 as if the commands were generated by a user located physically proximate to the remote computer 2. In this manner, character coordinates may be used within the automated testing program 10 to locate certain characters in order to test the execution of the computer program 8 from a remote location.

Turning now to FIGS. 2, 6, 7A-7B and 9 an illustrative routine 900 for recognizing the coordinates or location of characters within a display generated on a remote computer 2 and returning the character coordinates and whether the characters have been selected or highlighted to an automated testing program according to one embodiment of the invention will be described. The routine 900 begins at block 904, where the remote or first computer 4 executes the computer program 8 to be tested and the local or second computer 2 receives the redirected display of the remote or first computer 4 via the redirection device 12 transmitted to the plug-in 7 and displays the output on second computer 2 in a window or full screen. It should be appreciated that the redirection device 12 and the plug-in 7 perform the transmitting and displaying functions, respectively, in a continual manner so that an updated video display is continually displayed at the second computer 2. Moreover, it should be appreciated that displaying the video output of the first computer 4 at the second computer 2 is not necessary to test the computer program 8.

From block 904, the routine 900 continues to block 906, where BIOS DLL 5 receives a search string and a request locate the search string within the image. At block 908, a binarized representation of the display is generated as described in FIG. 6. From block 908 the routine 900 continues to block 910, where the characters of the search string retrieve vector values and a binary representation of each character is produced as described above in FIGS. 7A-7B. Next the routine 900 continues from block 910 to block 912 where a binary representation of the search string is generated by combining the individual character representations.

Next, routine 900 continues from block 912 to block 914 where the routine compares the binary representations of the display and the search string to locate the search string within the display or image. This may be accomplished by executing a pixel by pixel comparison between the search string and the image until the search string characters are found or the entire image has been searched. It should be appreciated that this search may be accomplished by comparing only the image pixels matching the specified text color and disregarding the other pixels or by searching and comparing both the text and the background color.

The routine 900 then continues from block 914 to block 916 where a determination is made as to whether the search string was found within the display or image. If the search string has been found, routine 900 branches to block 918 where the coordinates of the search string and an indicator that the characters have not been inversed in color, selected or highlighted are returned to the automated test program 10 for use in conjunction with the test scripts 11. The routine then continues to block 920 where the automated test program transmits instructions to inverse the color of the next string. It should be appreciated that this feature may be used to dynamically navigate within a BIOS interface, which utilizes arrow key movements to interface with the BIOS. Next the routine 900 branches back to block 904 where the second computer 4 receives the redirected display of the first computer as described above.

If the search string is not found, the routine 900 branches from block 916 to block 922 where an inverse binary representation of the search string is generated. Next the routine 900 searches for the original characters at block 924, however the search is for the characters with inverse color values. This feature enables the routine to return whether the characters have been selected or highlighted within the display. The routine then makes a determination as to whether the inverse search string has been found at block 926. If the inverse has not been found, the routine 900 branches to block 930 where an indication of 'No Match' is returned. Then the routine 900 terminates at block 936.

If the inverse search string is found, routine 900 branches YES from block 926 to block 928. At block 928, an indicator that the characters of the search string have been highlighted or selected is returned along with the coordinates of the search string within the display. Next the routine 900 continues to block 932 where the coordinates are used by the automated test program 10 in conjunction with test scripts 11 to identify the string of characters next to the highlighted search string. The routine 900 then returns the string of characters next to the search string and their location at block 934 and then terminates at block 936.

It should be appreciated that the above feature of locating the string or text next to the search string may be used from a remote location to identify what a BIOS parameter is set for. The BIOS DLL 5 is capable of finding, reading, and returning characters or text and their location so that the automated testing program 10 may receive and respond to the data. For instance if a NUMLOCK at boot parameter in BIOS was set to 'ENABLE', the BIOS DLL could read and return the location of NUMLOCK, whether the NUMLOCK has been selected or highlighted, and the characters next to the NUMLOCK at boot heading and their location to the automated testing program 10. The automated testing program 10, via test scripts 11 is capable of using the characters, their coordinates, and indicators to instruct the program to change the parameter to 'DISABLE'. For example, a test script could be written to instruct the program to arrow key to the left and enter in response to the parameter being set to ENABLE. This instruction from the test script could cause the computer program to convert the parameter to DISABLE.

Based on the foregoing, it should be appreciated that the various embodiments of the invention provide methods and systems for identifying the coordinates of characters within a bitmap image. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for recognizing the coordinates of one or more characters within a display generated on a first computer wherein the character coordinates are used for testing a computer program executing on the first computer wherein the computer program is tested from a second computer, the method comprising:

receiving the display of the first computer at the second computer, the display of the first computer transmitted to the second computer by an operating system independent video and input/output redirection device associated with the first computer;

receiving a search string identifying the characters and a request to locate the characters within the display;

generating a binary representation of the display and the search string;

in response to the request, locating the characters of the search string within the display and returning the location of the characters within the display and an indicator as to whether the characters are highlighted; and utilizing the indicator and the coordinates of the characters in an automated test program executing on the second computer to test the computer program executing on the first computer.

2. The method of claim 1, wherein generating a binary representation of the display comprises:

designating a range for a color value of one or more pixels within the display;

determining whether the color value for each pixel within the display is within the range;

in response to the color value for a pixel being within the range, setting a value in the binary representation corresponding to the pixel, to a first value; and in response to the color value for a pixel being outside the range, setting a value in the binary representation corresponding to the pixel, to a second value.

3. The method of claim 1, wherein generating a binary representation of the search string comprises:

determining the text code for each character within the search string;

based on the text code for each character, determining a vector value for each character; and based on the vector value for each character, generating a binary representation of each character and thereby generating a binary representation of the search string.

4. The method of claim 1, further comprising:

generating an inverse of the binary representation of the search string;

finding the inverse of the binary representation of the search string within the display; and in response to finding the inverse, returning a corresponding value indicating the search string is highlighted within the display.

5. The method of claim 4, further comprising in response to finding the inverse, utilizing the coordinates to read and return the characters next to the highlighted search string.

6. The method of claim 1, wherein the location is expressed using one or more pixel coordinates.

7. The method of claim 1, wherein the first computer and the second computer are physically located at two different locations and wherein the first computer and the second computer are connected via a communications network.

8. The method of claim 1, wherein the computer program executing on the first computer comprises an operating system program.

9. The method of claim 1, wherein the computer program executing on the remote computer comprises a basic input/output system program.

10. The method of claim 1, wherein the computer program executing on the remote computer comprises an application program.

11. A computer-controlled apparatus capable of performing the method of claim 1.

12. A computer-readable medium comprising computer executable instructions which, when executed by a computer, cause the computer to perform the method of claim 1.

13. A method for locating one or more characters within a display generated on a first computer wherein the character locations are used for testing a computer program executing on the first computer wherein the computer program is tested from a second computer using an automated test program, the method comprising:

receiving the display of the first computer at the second computer;

generating a binary representation of the display;

receiving a search string identifying the characters and a request to locate the characters within the display;

generating one or more binary representations of the characters to create a binary representation of the search string;

comparing the binary representations of the characters with the binary representation of the display to identify the location of the binary representation of the characters within the display;

in response to the request, returning the location of the binary representation of the characters within the display; and from a local computer, utilizing the location of the binary representation of the characters to navigate in the computer program executing on the first computer.

14. A method for recognizing a location of one or more characters within an image, comprising:

receiving a search string identifying the characters and a request to locate the characters within the image;

generating a binary representation of the image and the search string, wherein generating a binary representation of the image comprises:

designating a range for a color value of one or more pixels within the image, determining whether the color value for each pixel within the image is within the range, in response to the color value for a pixel being within the range, setting a value in the binary representation corresponding to the pixel, to a first value, and in response to the color value for a pixel being outside the range, setting a value in the binary representation corresponding to the pixel, to a second value;

generating a binary representation of the search string, wherein generating a binary representation of the search string comprises:

determining a text code for each character within the search string, based on the text code for each character, determining a vector value for each character, and based on the vector value for each character, generating a binary representation of each character and thereby generating a binary representation of the search string;

in response to the request, locating the characters of the search string within the binary representation of the image;

returning the location of the characters within the binary representation of the image;

generating an inverse of the binary representation of the search string; and finding the inverse of the binary representation of the search string within the image;

in response to finding the inverse, returning a corresponding value indicating the search string is highlighted within the image; and in response to finding the binary representation of the search string, returning a corresponding value indicating the search string is unselected within the image.

15. The method of claim 14, further comprising in response to finding the inverse, reading and returning the location of the characters next to the highlighted search string.

16. A method for recognizing the coordinates of one or more characters within a display generated on a first computer wherein the character coordinates are used for testing a computer program executing on the first computer wherein the computer program is tested from a second computer, the method comprising:

receiving the display of the first computer at the second computer;

receiving a search string identifying the characters and a request to locate the characters within the display;

generating a binary representation of the display, wherein generating a binary representation of the display comprises:

designating a range for a color value of one or more pixels within the display, determining whether the color value for each pixel within the display is within the range, in response to the color value for a pixel being within the range, setting a value in the binary representation corresponding to the pixel, to a first value, and in response to the color value for a pixel being outside the range, setting a value in the binary representation corresponding to the pixel, to a second value;

generating a binary representation of the search string, wherein generating a binary representation of the search string comprises:

determining the text code for each character within the search string, based on the text code for each character, determining a vector value for each character, and based on the vector value for each character, generating a binary representation of each character and thereby generating a binary representation of the search string;

in response to the request, locating the characters of the search string within the display and returning the location of the characters within the display and an indicator as to whether the characters are highlighted;

utilizing the indicator and the coordinates of the characters in an automated test program executing on the second computer to test the computer program executing on the first computer;

generating an inverse of the binary representation of the search string;

finding the inverse of the binary representation of the search string within the display; and in response to finding the inverse, returning a corresponding value indicating the search string is highlighted within the display.

17. The method of claim 16, further comprising in response to finding the inverse, utilizing the coordinates to read and return the characters next to the highlighted search string.

* * * * *

UNITED STATES PATENT AND TRADEMARK OFFICE
CERTIFICATE OF CORRECTION

PATENT NO. : 7,418,141 B2  Page 1 of 1
APPLICATION NO. : 10/403198
DATED : August 26, 2008
INVENTOR(S) : Messer et al.

It is certified that error appears in the above-identified patent and that said Letters Patent is hereby corrected as shown below:

Item (56) References Cited

On page 2, right column
Lines 8 through 9 should read:
U.S. Official Action dated Apr. 18, 2006 in U.S. Appl. No. ~~10/016,484~~ 10/966,221.

On page 3
Insert the reference --U.S. Official Action dated August 13, 2003 in U.S. Serial No. 10/016,484.--.

On Page 3
Insert the reference --U.S. Notice of Allowance and Allowability dated November 1, 2007 in U.S. Serial No. 10/462,509.--.

Signed and Sealed this

Twentieth Day of April, 2010

David J. Kappos
*Director of the United States Patent and Trademark Office*